(12) United States Patent
Sano

(10) Patent No.: US 8,563,176 B2
(45) Date of Patent: Oct. 22, 2013

(54) LITHIUM PRIMARY BATTERY AND METHOD FOR PRODUCING THE SAME

(75) Inventor: Yoko Sano, Osaka (JP)

(73) Assignee: Panasonic Corporation, Osaka (JP)

( * ) Notice: Subject to any disclaimer, the term of this patent is extended or adjusted under 35 U.S.C. 154(b) by 517 days.

(21) Appl. No.: 12/760,203

(22) Filed: Apr. 14, 2010

(65) Prior Publication Data

US 2010/0273059 A1 Oct. 28, 2010

(30) Foreign Application Priority Data

Apr. 27, 2009 (JP) ................................ 2009-107881

(51) Int. Cl.
*H01M 4/58* (2010.01)
*H01M 6/00* (2006.01)
*H01M 6/14* (2006.01)

(52) U.S. Cl.
USPC ..................................... 429/231.7; 29/623.5

(58) Field of Classification Search
USPC ..................................... 429/231.7; 29/623.5
See application file for complete search history.

(56) References Cited

U.S. PATENT DOCUMENTS

| | | | |
|---|---|---|---|
| 6,068,921 A * | 5/2000 | Yamana et al. | 428/402 |
| 6,284,409 B1 * | 9/2001 | Higashiyama et al. | 429/218.2 |
| 2002/0086213 A1 * | 7/2002 | Utsugi et al. | 429/231.95 |
| 2004/0042954 A1 * | 3/2004 | Park et al. | 423/445 R |
| 2004/0121235 A1 * | 6/2004 | Amatucci | 429/231.95 |
| 2009/0004568 A1 * | 1/2009 | Hirose et al. | 429/221 |
| 2009/0263722 A1 * | 10/2009 | Sano et al. | 429/231.95 |

FOREIGN PATENT DOCUMENTS

| | | |
|---|---|---|
| CN | 1476644 A | 2/2004 |
| JP | 11-135116 | 5/1999 |
| JP | 2002-141058 | 5/2002 |

OTHER PUBLICATIONS

Chinese Office Action issued in Chinese Patent Application No. 201010173559.6 dated Jun. 25, 2012.

* cited by examiner

*Primary Examiner* — Karie O'Neill Apicella
(74) *Attorney, Agent, or Firm* — McDermott Will & Emery LLP

(57) ABSTRACT

The invention provides a lithium primary battery including a negative electrode 12 comprising metal lithium or a lithium alloy, a positive electrode 11 including a positive electrode active material, a separator 13 interposed between the negative electrode 12 and the positive electrode 11, and a non-aqueous electrolyte. The negative electrode 12 includes a coating layer 17 on a surface thereof facing the positive electrode 11, the coating layer containing carbon particles each having fluorine-containing fine particles on the surface thereof, for the purpose of improving both the discharge performance and the high temperature storage characteristics.

11 Claims, 1 Drawing Sheet

LITHIUM PRIMARY BATTERY AND METHOD FOR PRODUCING THE SAME

FIELD OF THE INVENTION

The invention mainly relates to a lithium primary battery and a method for producing the same, and more specifically, mainly relates to improvement of a negative electrode for use in a lithium primary battery.

BACKGROUND OF THE INVENTION

Lithium primary batteries include a positive electrode including a positive electrode active material such as manganese dioxide or fluorinated graphite, a negative electrode comprising lithium or a lithium alloy, a separator interposed between the positive electrode and the negative electrode, and a non-aqueous electrolyte being in contact with the positive electrode, the negative electrode, and the separator. Lithium primary batteries have a high electromotive force and a high energy density and therefore are widely used as a main power source for portable equipment, vehicle-mounted electronic equipment, and the like, a backup power source, and other applications.

Generally, lithium primary batteries exhibit a drop in voltage at the beginning of discharge, followed by a slow increase in voltage. The larger the degree of the drop in voltage at the beginning of discharge is, the lower the discharge performance of lithium primary batteries is. In this context, attempts have been made to activate the surface of the negative electrode in order to improve the discharge performance. In a lithium primary battery including a negative electrode having an activated surface, however, the battery characteristics after storage at high temperature are significantly deteriorated. This is because the reaction between the activated negative electrode and the non-aqueous electrolyte is facilitated due to the high temperature, and a reaction product is deposited on the surface of the negative electrode, causing the resistance at the surface of the negative electrode to increase.

On the other hand, in the case of lithium secondary batteries, which include a negative electrode containing lithium or a lithium alloy, lithium in the negative electrode is repeatedly dissolved and precipitated during charge/discharge cycling. As such, the surface of the negative electrode of lithium secondary batteries is renewed every charge/discharge cycle and thus is maintained in a low resistance state. In lithium secondary batteries, however, dendritic crystals (dendrites) of lithium may grow on the surface of the negative electrode as the charge/discharge cycle is repeated.

Japanese Laid-Open Patent Publication No. Hei 11-135116 discloses a negative electrode for a lithium secondary battery, the negative electrode comprising metal lithium or a lithium alloy and a carbon powder layer formed on the surface of the metal lithium or lithium alloy. Japanese Laid-Open Patent Publication No. 2002-141058 discloses a negative electrode for a lithium secondary battery, the negative electrode comprising an electrically conductive substrate, a lithium layer containing metal lithium or an alloy thereof and being formed on the surface of the conductive substrate, and a metal fluoride layer being made of lithium fluoride or the like and formed on the surface of the lithium layer.

BRIEF SUMMARY OF THE INVENTION

In lithium primary batteries which are not charged while in operation, however, the effect of repeating charge and discharge to maintain the negative electrode in a low resistance state cannot be obtained. It has been therefore difficult to achieve both improvement in discharge performance at the beginning of discharge and improvement in discharge performance after storage at high temperature.

According to the configuration disclosed in Japanese Laid-Open Patent Publication No. Hei 11-135116, the reaction between the lithium and the non-aqueous electrolyte is inhibited. Further, the carbon in the carbon powder layer acts as a conductive agent at a portion where the lithium activity is weakened, reducing the resistance at the negative electrode. As such, the discharge performance of the battery is improved. However, since the activity at the negative electrode is enhanced, the reaction between the negative electrode and the non-aqueous electrolyte that occurs on the surface of the carbon powder layer during storage at high temperature is not sufficiently inhibited. Consequently, in the battery disclosed in the above publication, the resistance of the negative electrode is increased after storage at high temperature. According to the configuration disclosed in Japanese Laid-Open Patent Publication No. 2002-141058, since the metal fluoride is an insulating material, the resistance of the negative electrode is increased, and the activity at the negative electrode is weakened. As such, when the battery is stored at high temperature, the increase in resistance of the negative electrode is suppressed; however the suppression is insufficient because the initial resistance of the negative electrode is high. Consequently, the discharge performance is deteriorated.

An aspect of the invention is a lithium primary battery including a negative electrode comprising metal lithium or a lithium alloy, a positive electrode including a positive electrode active material, a separator interposed between the negative electrode and the positive electrode, and a non-aqueous electrolyte, wherein the negative electrode further comprises a coating layer on a surface thereof facing the positive electrode, and the coating layer contains carbon particles each having fluorine-containing fine particles on a surface thereof.

Another aspect of the invention is a method for producing a lithium primary battery, the method including the steps of: preparing a positive electrode including a positive electrode active material; forming a coating layer precursor containing fluorinated graphite on at least a part of a surface of a negative electrode comprising metal lithium or a lithium alloy; placing a separator between the positive electrode and the negative electrode such that the coating layer precursor and the positive electrode face each other, to form an electrode assembly; and bringing the coating layer precursor into contact with a non-aqueous electrolyte to form a coating layer on the surface of the negative electrode facing the positive electrode, the coating layer containing carbon particles each having fluorine-containing fine particles on a surface thereof.

According to the invention, in a lithium primary battery including a negative electrode comprising metal lithium or a lithium alloy, both the discharge performance and the storage characteristics can be simultaneously improved.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
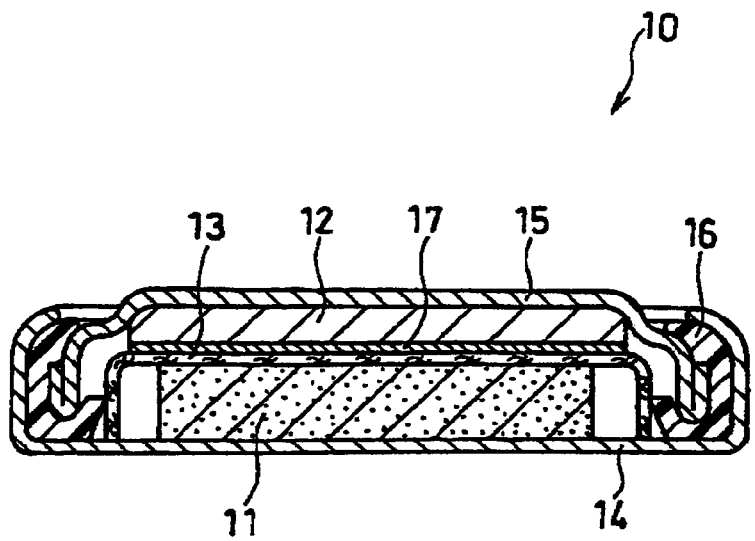
FIG. 1 is a schematic longitudinal cross-sectional view of a coin lithium primary battery according to one embodiment of the invention.
Figure 2:
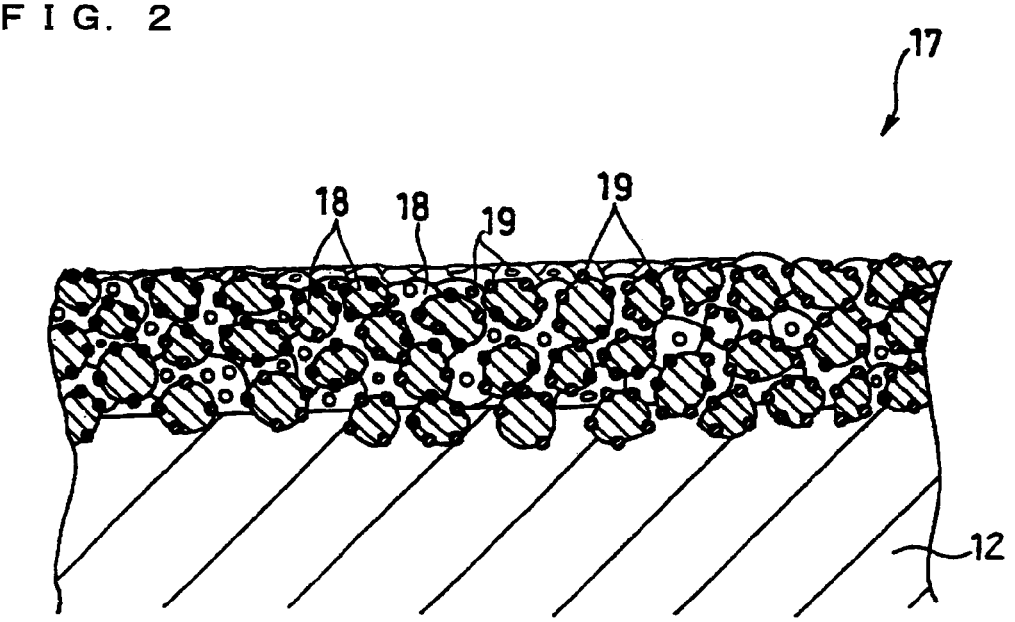
FIG. 2 is an enlarged cross-sectional view schematically showing a coating layer 17 in FIG. 1.

FIG. 1 is a schematic longitudinal cross-sectional view of a lithium primary battery according to one embodiment of the invention. A coin lithium primary battery 10 shown in FIG. 1 includes a negative electrode 12, and a positive electrode 11, a separator 13 interposed between the negative electrode 12 and the positive electrode 11. In addition, the negative electrode 12, the positive electrode 11, and the separator 13 are in contact with a non-aqueous electrolyte (not shown).

The negative electrode 12 is formed of metal lithium or a lithium alloy shaped like a disk. One surface of the negative electrode 12 is in contact with a negative electrode case 15. The other surface of the negative electrode 12 oppositely facing the surface thereof being in contact with the negative electrode case 15 faces the positive electrode 11. The surface facing the positive electrode 11 is provided with a coating layer 17.

For the lithium alloy to be formed into the negative electrode 12, any lithium alloy known in the field of lithium primary batteries may be used. Examples of the metal alloyed with lithium include Al, Sn, Mg, In, Ca and Mn. The metal alloyed with lithium may be contained alone or in combination of two or more in the lithium alloy.

A lithium alloy containing metal lithium and a metal other than the metal lithium in an appropriate ratio exhibits improved physical properties and surface condition as compared with metal lithium. The content of the metal alloyed with lithium in a lithium alloy is not particularly limited but is preferably 5% by mass or less based on the total mass of the lithium alloy. When the content of the metal alloyed with lithium in a lithium alloy exceeds the above range, the melting point and the hardness of the lithium alloy increase, which may result in a reduction in processability of the negative electrode 12.

The coating layer 17 contains carbon particles 18. The carbon particles 18 improve the electrical conductivity of the surface of the negative electrode 12, thereby reducing the surface resistance of the negative electrode 12 and improving the discharge performance. The carbon particles 18 each have fluorine-containing fine particles 19 on the surface thereof. The fluorine-containing fine particles 19 inhibit the reaction between the lithium or lithium alloy and the non-aqueous electrolyte, thereby suppressing the increase in resistance of the negative electrode 12 even after storage at high temperature. The fluorine-containing particles 19, because of being an insulating material, inherently increase the resistance of the negative electrode 12. In the coating layer 17 of this embodiment, however, since the fluorine-containing fine particles 19 are present in the form of fine particles on the surface of the carbon particle 18, the increase in resistance of the negative electrode 12 can be suppressed.

As such, according to the lithium primary battery 10 of this embodiment, the discharge performance can be improved due to the presence of the carbon particles 18 in the coating layer 17 formed on a surface facing the positive electrode 11 of the negative electrode 12, and moreover, the increase in resistance of the negative electrode 12 after storage at high temperature can be suppressed due to the presence of the fluorine-containing fine particles 19 on the surfaces of the carbon particles 18.

The carbon particles 18 each having the fluorine-containing fine particles 19 on the surface thereof can be prepared by, for example, forming a coating layer precursor containing fluorinated graphite on the surface of the negative electrode 12 comprising metal lithium or a lithium alloy, and bringing the coating layer precursor into contact with a non-aqueous electrolyte. The fluorinated graphite in the coating layer precursor reacts with lithium to form carbon particles and fluorine-containing fine particles attached onto the surfaces of the carbon particles. The resultant fluorine-containing fine particles are mainly composed of lithium fluoride.

The carbon particles 18 contained in the coating layer 17 preferably each have a first surface region covered with the fluorine-containing fine particles 19 and a second surface region where the surface of the carbon particle 18 itself is exposed. By ensuring the presence of the second surface region where the surface of the carbon particle 18 itself is exposed, the resistance and the activity of the negative electrode 12 can be appropriately adjusted.

The fluorine-containing fine particles 19, which are formed using fluorinated graphite as a starting material and formed on the surfaces of the carbon particles 18 as described above, are present almost uniformly in the interior of the coating layer 17. In short, the first surface region and the second surface region are present in the interior of the coating layer 17 in an approximately equal ratio.

It should be noted that when a metal fluoride layer is formed on the negative electrode surface as in the negative electrode for a lithium secondary battery as disclosed in Japanese Laid-Open Patent Publication No. 2002-141058, the layer formed on the negative electrode surface is a dense layer composed of a metal fluoride. This means that a large area of the negative electrode surface is covered with an insulating material, leaving a small area where the conductivity is high. Consequently, the increase in resistance at the negative electrode cannot be suppressed. Further, when graphite particles are merely attached onto the surface of the negative electrode, lithium in the negative electrode may react with the fluorine atoms in the non-aqueous electrolyte such as $LiPF_6$, and lithium fluoride may be produced. The resultant lithium fluoride, however, is unevenly distributed on the surface side of the graphite layer (i.e., on the surface of the negative electrode facing the positive electrode), and, will form a dense layer particularly after storage at high temperature.

The fluorinated graphite for forming a coating layer precursor is in a powder state. The fluorinated graphite has a volumetric average particle diameter preferably of 0.1 to 50 μm, and more preferably of 1 to 40 μm. When the volumetric average particle diameter of the fluorinated graphite powder exceeds 50 μm, it may become difficult to uniformly form a fluorinated graphite powder layer on the surface of the metal lithium or lithium alloy, or it may happen that a fluorinated graphite powder layer having an excessively large thickness is formed. If the fluorinated graphite powder layer is not uniformly formed, it becomes impossible to uniformly form the coating layer 17 on the surface of the negative electrode 12, which may reduce the effect of inhibiting the reaction between the metal lithium or lithium alloy and the non-aqueous electrolyte. If the thickness of the fluorinated graphite powder layer is excessively large, the volume of the negative electrode active material is decreased, which may reduce the capacity of the battery.

On the other hand, when the volumetric average particle diameter of the fluorinated graphite powder is below 0.1 μm, the particle diameter of the carbon particles 18 obtained by the contact of the metal lithium or lithium alloy with the non-aqueous electrolyte is decreased. As such, the fluorine-containing fine particles 19 tend to cover a larger area of the surface of each carbon particle 18. Consequently, the area of the second surface region where the surface of the carbon particle 18 itself is exposed is decreased, which may increase the resistance of the negative electrode 12.

In this embodiment, the fluorinated graphite is a material that is solid at room temperature, the material being obtained by fluorinating a carbon material such as graphite. Examples of the carbon material include petroleum coke, artificial graphite, and natural graphite. The carbon material (C) is allowed to react with fluorine (F), for example, in a ratio of 1:x, where $0.9 \leq x \leq 1.1$. Here, the ratio is a molar ratio of carbon atoms to fluorine atoms. In such a manner, fluorinated graphite in which C and F are bonded to each other in a ratio of 1:x can be obtained. The particle diameter of the fluorinated graphite powder can be adjusted appropriately by pulverization, classification or the like.

The distributed state of carbon and fluorine in the coating layer 17 (i.e., the distribution in the coating layer 17 of the second surface region where the surface of the carbon particle 18 itself is exposed and the first surface region where the carbon particle 18 is covered with the fluorine-containing fine particles 19) can be identified by, for example, element distribution analysis with an electron probe micro analyzer (EPMA) (i.e., wavelength dispersion method).

The presence of the carbon particles 18 in the coating layer 17 and the presence of the fluorine-containing fine particles 19 on the surfaces of the carbon particles 18 can be identified by observation under a scanning electron microscope (SEM) and by element distribution analysis with an electron probe micro analyzer (EPMA) (i.e., wavelength dispersion method).

The particle diameter of the carbon particles 18 and the particle diameter of the fluorine-containing fine particles 19 formed on the surfaces of the carbon particles 18 can also be measured by using the SEM and the EPMA.

The carbon particles 18 have a particle diameter preferably of 0.1 to 30 µm, and more preferably of 1 to 20 µm. When the particle diameter of the carbon particles 18 is below 0.1 µm, the carbon particles 18 and the produced fluorine-containing fine particles 19 may form a coating layer in a dense film state, increasing the resistance of the negative electrode surface. Conversely, when the particle diameter of the carbon particles 18 exceeds 30 µm, it may become impossible to uniformly adjust the thickness of the coating layer 17.

The fluorine-containing fine particles 19 have a particle diameter preferably of 500 nm or less, and more preferably of 20 to 300 nm. When the particle diameter of the fluorine-containing fine particles 19 exceeds 500 nm, the resistance at the negative electrode surface may be increased.

The coating layer 17 may be formed after the formation of metal lithium or a lithium alloy into a disk having a predetermined diameter by punching. In this procedure, a coating layer precursor is formed on the surface of the negative electrode 12, and the negative electrode 12 with the coating layer precursor is combined with the positive electrode 11 and the separator 13 as described in detail below to form an electrode assembly. The resultant electrode assembly is brought into contact with a non-aqueous electrolyte, so that the coating layer precursor is converted into the coating layer 17.

Alternatively, a coating layer precursor may be formed on the surface of metal lithium or a lithium alloy before formed into a disk, and the coating layer precursor may then be brought into contact with a non-aqueous electrolyte. In this procedure, since the coating layer 17 is first formed on the surface of metal lithium or a lithium alloy, the disk-shaped negative electrode 12 can be obtained by punching the metal lithium or the lithium alloy with the coating layer 17 into a disk having a predetermined diameter. The negative electrode 12 thus obtained is placed in the negative electrode case 15 such that the coating layer 17 (or the coating layer precursor) faces the positive electrode 11.

When fluorinated graphite is used as a material for forming the coating layer 17, fine particles of lithium fluoride are formed as the fluorine-containing fine particles. Lithium fluoride is very stable and is capable of inhibiting the reaction between the negative electrode and the non-aqueous electrolyte from proceeding excessively during storage of the battery at a high temperature.

The material for forming the coating layer 17 is not limited to the above-described fluorinated graphite and may be any material as long as the material can form carbon particles each having fluorine-containing fine particles on the surface thereof, on the surface of the negative electrode 12. Such a material may be, for example, a mixture composed of lithium fluoride fine particles and carbon black or graphite particles.

Examples of the carbon black include furnace black, channel black, acetylene black, and thermal black. The graphite may be either natural graphite or artificial graphite.

When the above-mentioned mixture is used as the material for forming the coating layer 17, the lithium fluoride fine particles and the carbon black or graphite particles correspond to the fluorine-containing fine particles 19 and the carbon particles 18 in the coating layer 17 that are formed from fluorinated graphite powder as described above, respectively. As such, the preferred particle diameters of the lithium fluoride fine particles and the carbon black or graphite particles are the same as those of the above-described fluorine-containing fine particles 19 and carbon particles 18.

The method of placing a coating layer-forming material, such as fluorinated graphite, on the surface of lithium or a lithium alloy to form a coating layer precursor may be any known method of covering the surface of a substrate with powder. One example of such a method is a method as disclosed in Japanese Laid-Open Patent Publication No. Hei 11-135116, the method using a drum that has an electrically insulating surface and rotates while being in contact with the surface of metal lithium or a lithium alloy. In this method, first, the surface of the drum is electrically charged, and a layer of fluorinated graphite powder is formed on the charged surface such that the layer has a constant thickness. The layer of fluorinated graphite formed on the drum surface is then transferred to the surface of metal lithium or a lithium alloy. The transferred layer of fluorinated graphite is fixed onto the surface of the metal lithium or lithium alloy by, for example, press-laminating with press rollers and the like. Other suitable methods of fixing the fluorinated graphite layer onto the surface of the metal lithium or lithium alloy include press-bonding, ultrasonic-bonding, and the like.

The thickness of the coating layer 17 is not particularly limited, but is preferably 0.5 to 30 µm, and more preferably 1 to 10 µm, and particularly preferably 2 to 5 µm. The coating layer 17 may be defined not by the thickness thereof but by the amount of the carbon particles 18 each having the fluorine-containing fine particles 19, the carbon particles 18 being attached onto the surface of the lithium or lithium alloy. In the latter definition, the amount of the carbon particles 18 each having the fluorine-containing fine particles 19 per $cm^2$ of the surface of the lithium or lithium alloy is preferably 0.1 to 1 mg, and more preferably 0.3 to 1 mg.

Similarly to the conventional negative electrode for a lithium primary battery, the metal lithium or lithium alloy is formed into any shape and any thickness according to the shape, size, specified performance and the like of a lithium primary battery to be finally obtained. For example, when the lithium primary battery to be finally obtained is a coin battery, the metal lithium or lithium alloy is formed into a disk having a diameter of about 5 to 25 mm and a thickness of about 0.2 to 2 mm.

Referring to FIG. 1 again, the negative electrode case 15 is a member being in contact with the negative electrode 12 and serving as a negative electrode current collector and a negative electrode terminal. The negative electrode case 15 also serves as a sealing plate of a coin battery. The negative electrode case 15 may be made of any material known in the field of lithium primary batteries. Examples of such a material include stainless, steel.

The positive electrode 11 is a positive electrode material mixture formed into a disk-like pellet. One of the oppositely facing surfaces of the positive electrode 11 is in contact with a positive electrode case 14. The positive electrode material mixture contains a positive electrode active material and further contains an additive such as a conductive agent and a binder, if necessary.

For the positive electrode active material, any active material known in the field of lithium primary batteries may be used. For example, fluorinated graphite, a metal oxide such as $MO_2$ (M is at least one transition metal such as Ni, Co, Mn and Cu), $MoO_3$, $V_2O_5$, or $Mn_2O_4$, a metal chalcogenide such as $TiS_2$ or $MoS_2$, and the like may be used. These materials may be used alone or in combination of two or more. Among the above listed materials, fluorinated graphite and manganese dioxide (i.e., $MO_2$ where M is Mn) are particularly preferred as the positive electrode active material. These materials are commonly used in the field of lithium primary batteries and are easily commercially available. Moreover, fluorinated graphite, when used as the positive electrode active material, exhibits excellent reliability over a long period of time and excellent stability at high temperature.

For the conductive agent contained in the positive electrode material mixture, a material that causes no chemical reaction at a potential within the range of the potential of the positive electrode active material during discharge may be used. For example, graphite, carbon black, carbon fibers, metallic fibers, organic conductive materials, and the like may be used. These may be used alone or in combination of two or more.

The amount of the conductive agent contained in the positive electrode material mixture is not particularly limited, but, for example, is preferably 30 parts by mass or less and more preferably 5 to 30 parts by mass per 100 parts by mass of the positive electrode active material.

For binder contained in the positive electrode material mixture, a material that causes no chemical reaction at a potential within the range of the potential of the positive electrode active material during discharge may be used. For example, fluorocarbon resin, fluorine-based rubber, styrene-butadiene rubber, polyacrylic acid, polyvinylidene fluoride, and the like may be used. These may be used alone or in combination of two or more.

The amount of the binder contained in the positive electrode material mixture is not particularly limited, but, for example, is preferably 3 to 15 parts by mass per 100 parts by mass of the positive electrode active material.

The positive electrode case 14 is a member accommodating the positive electrode 11 and the separator 13 as described in detail below and serving as a positive electrode current collector and a positive electrode terminal. The positive electrode case 14 may be made of any material known in the field of lithium primary batteries. Examples of such a material include stainless steel.

In the above, it is assumed that the positive electrode 11 is a positive electrode material mixture formed into a disk-like pellet, but the positive electrode for use in lithium primary batteries is not limited thereto. For example, a positive electrode obtained by dispersing or dissolving the foregoing positive electrode material mixture in an appropriate liquid component such as N-methyl-2-pyrrolidone and applying the resultant slurry onto the surface of the current collector (core material) such as aluminum foil, followed by drying may be used.

For the separator 13, a porous film made of a material having resistivity to the internal environment of lithium primary batteries may be used. For example, nonwoven fabrics made of synthetic resin, porous films made of synthetic resin, and the like may be used. Examples of the synthetic resin used for nonwoven fabrics include polypropylene, polyphenylene sulfide, and polybutylene terephthalate. Among these, polyphenylene sulfide, and polybutylene terephthalate are particularly preferred because of their excellent high temperature resistance, favorable solvent resistance, and good electrolyte retention. Examples of the synthetic resin used for a porous film include polyethylene and polypropylene.

The non-aqueous electrolyte contains a non-aqueous solvent and a solute dissolved in the non-aqueous solvent.

For the non-aqueous solvent, any solvent known in the field of lithium primary batteries may be used. For example, γ-butyrolactone, γ-valerolactone, propylene carbonate, ethylene carbonate, butylene carbonate, vinylene carbonate, vinyl ethylene carbonate, 1,2-dimethoxyethane, 1,2-diethoxy ethane, 1,3-dioxolane, dimethyl carbonate, diethyl carbonate, ethyl methyl carbonate, N,N-dimethylformamide, tetrahydrofuran, 2-methyltetrahydrofuran, dimethylsulfoxide, formamide, acetamide, dimethylformamide, acetonitrile, propionitrile, nitromethane, ethyl monoglyme, trimethoxy methane, dioxolane, dioxolane derivatives, sulfolane, methyl sulfolane, propylene carbonate derivatives, tetrahydrofuran derivatives, and the like may be used. These may be used alone or in combination of two or more. Among these, γ-butyrolactone is particularly preferred as the non-aqueous solvent because γ-butyrolactone is stable over a wide temperature range and exhibits good solubility of solute.

For the solute (supporting salt) used in the non-aqueous electrolyte, any solute known in the field of lithium primary batteries may be used. For example, $LiPF_5$, $LiClO_4$, $LiBF_4$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and the like may be used. These may be used alone or in combination of two or more.

The concentration of the solute in the non-aqueous electrolyte is not particularly limited, but is preferably 0.5 to 1.5 mol/L. When the solute concentration is below the above range, the discharge performance at room temperature, the long term storage characteristics, and the like may be deteriorated. Conversely, when the solute concentration exceeds the above range, the increase in viscosity of the non-aqueous electrolyte at a low environmental temperature of about −40° C., the reduction in ion conductivity, and other adverse effects may become severe.

When the non-aqueous solvent includes γ-butyrolactone, the solute preferably includes $LiBF_4$ in the solute. Using γ-butyrolactone in combination with $LiBF_4$ further improves the high temperature storage characteristics of a lithium primary battery.

When the positive electrode active material is manganese dioxide, because of the very high reactivity of manganese dioxide with the non-aqueous electrolyte, it is preferable to add a sultone compound, such as 1,3-propane sultone or 1,4-butane sultone, in the non-aqueous electrolyte. Adding a sultone compound decreases the reactivity at the positive electrode during storage at high temperature.

The gasket 16 mainly provides insulation between the positive electrode case 14 and the negative electrode case 15. The gasket 16 may be made of, for example, synthetic resin such as polypropylene, polyphenylene sulfide, or polyetheretherketone. Among these, polyphenylene sulfide is particularly preferred because of its excellent high temperature resistance, favorable solvent resistance, and good moldability.

The lithium primary battery of the invention is produced by a method comprising:

(i) preparing a positive electrode 11 including a positive electrode active material, (ii) forming a coating layer precursor containing fluorinated graphite on at least a part of a surface of a negative electrode 12 comprising metal lithium or a lithium alloy, (iii) placing a separator 13 between the positive electrode 11 and the negative electrode 12 such that the coating layer precursor and the positive electrode 11 face each other, to form an electrode assembly, and (iv) bringing the coating layer precursor into contact with a non-aqueous electrolyte to form a coating layer 17 on the surface of the negative electrode 12 facing the positive electrode 11, the coating layer 17 containing carbon particles 18 each having fluorine-containing fine particles 19 on a surface thereof.

The above steps (i) and (iv) can be carried out by any method known in the field of lithium primary batteries.

In the step (ii), the coating layer precursor is formed by allowing fluorinated graphite to attach on the surface of the negative electrode comprising metal lithium or a lithium alloy. The step (iv), namely, the step of bringing the coating layer precursor formed on the surface of the lithium or lithium alloy into contact with a non-aqueous electrolyte, may be performed after the step of (iii) of forming an electrode assembly, or alternatively, prior to the step of (iii) of forming an electrode assembly and after the step of (ii) of forming a coating layer precursor.

The coating layer precursor formed on the surface of the negative electrode 12 in the process (ii), upon contact with a non-aqueous electrolyte in the step (iv), rapidly forms carbon particles having fluorine-containing fine particles on the surfaces thereof. As a result, a coating layer 17 is formed on the surface of the negative electrode 12.

The steps (ii) to (iv) are preferably performed in dry air with a dew point of −50° C. or lower.

In the above method of producing a lithium primary battery, the positive electrode active material is preferably fluorinated graphite or manganese dioxide.

In the above, it is assumed that the invention is applied to a coin lithium primary battery, but the lithium primary battery of the invention is not limited thereto. The lithium primary battery may be not only of a coin shape but also of any shape, such as a cylindrical shape, a prismatic shape, a sheet shape, a flat shape, and a laminate shape, selected appropriately according to the application to which the lithium primary battery of the invention is applied.

EXAMPLES

In the following, the invention is specifically described with reference to Examples.

Production of Lithium Primary Battery

Example 1

A coin lithium primary battery 10 as shown in FIG. 1 was produced according to the following procedures.

(1) Preparation of Non-Aqueous Electrolyte

Lithium tetrafluoroborate ($LiBF_4$) was dissolved in γ-butyrolactone (γ-BL), to prepare a non-aqueous electrolyte containing $LiBF_4$ at a concentration of 1 mol/L (hereinafter simply referred to as "$LiBF_4$/γ-BL").

(2) Formation of Positive Electrode 11

A petroleum coke was fluorinated to give fluorinated graphite (($CF_{1.0})_n$). The fluorinated graphite had a volumetric average particle diameter of 10 μm.

The fluorinated graphite thus obtained was mixed with acetylene black and styrene-butadiene rubber in a ratio of 100:15:6 by mass. To the resultant mixture, water and isopropyl alcohol were added and sufficiently kneaded, to prepare a positive electrode material mixture. The positive electrode material mixture was heated to 70° C., and dried. The dried positive electrode material mixture was filled in a mold and pressed and molded with a hydraulic press machine, to yield a pellet of 16 mm in diameter and 3 mm in thickness. The pellet was dried at 100° C. for 12 hours, whereby a positive electrode 11 was obtained.

(3) Formation of Negative Electrode 12

A 1.3-mm-thick metal lithium sheet was placed on the anvil of an ultrasonic vibration bonding machine. Onto the surface of the metal lithium sheet, fluorinated graphite (($CF_{1.0})_n$) powder having a volumetric average particle diameter of 10 μm was placed at a rate of 0.7 mg per cm² of the surface of the metal lithium sheet, to form a layer composed of fluorinated graphite powder. Subsequently, the horn of the ultrasonic vibration bonding machine was brought into contact with the layer composed of fluorinated graphite powder, and the metal lithium sheet and the layer composed of fluorinated graphite powder were subjected to ultrasonic vibration, while being pressurized. In such a manner, a coating layer precursor was formed on the surface of the metal lithium sheet. The thickness of the coating layer precursor was 5 μm. The metal lithium sheet provided with the coating layer precursor was punched into a circle of 18.0 mm in diameter, whereby a negative electrode 12 was obtained.

The surface of the negative electrode 12 opposite to the surface on which the coating layer precursor was formed was brought into contact with the inner bottom surface of a negative electrode case 15 made of stainless steel, and was press-fitted thereto. Here, the formation of the negative electrode 12 and the press-fitting of the negative electrode 12 to the negative electrode case 15 were performed in dry air with a dew point of −50° C. or lower.

(4) Fabrication of Lithium Primary Battery 10

The positive electrode 11 was placed on the inner bottom surface of a positive electrode case 14 made of stainless steel, and on the surface of the positive electrode 11, a separator 13 was placed. For the separator 13, nonwoven fabric made of polybutylene terephthalate was used. Thereafter, the positive electrode 11 and the separator 13 in the positive electrode case 14 were brought into contact with the non-aqueous electrolyte ($LiBF_4$/γ-BL).

Next, the negative electrode case 15 with the negative electrode 12 press-fitted thereto was mounted on the positive electrode case 14 with the positive electrode placed thereon, in such a state that the coating layer precursor of the negative electrode 12 and the positive electrode 11 face each other with the separator 13 interposed therebetween. A gasket 16 was attached on the periphery of the negative electrode case 15, and the open end of the positive electrode case 14 was crimped to the negative electrode case 15 with the gasket 16 interposed therebetween. The coin lithium primary battery 10 as shown in FIG. 1 was thus fabricated. The fabrication of the lithium primary battery was performed in dry air with a dew point of −50° C. or lower. The lithium primary battery 10 thus fabricated had an outer diameter of 24.5 mm and a thickness of 5.0 mm.

Immediately after fabrication, several batteries were sampled from a plurality of the lithium primary batteries 10 fabricated in the same manner as described above, and were subjected to a preliminary discharge at a constant current of 4 mA for 30 minutes. The sample batteries having been subjected to the preliminary discharge was aged for 1 day in a 60° C. environment. The aged sample batteries were each disassembled to take out the negative electrode 12 therefrom, and the thickness of the coating layer 17 on the surface of the metal lithium sheet was measured. The results found no significant difference between the measured thickness of the coating layer 17 and the thickness of the coating layer precursor.

Comparative Example 1

A lithium primary battery was fabricated in the same manner as in Example 1 except that metal lithium sheet punched into a circle of 18.0 mm in diameter (the same negative electrode 12 in Example 1 except that no coating layer precursor was formed) was used as the negative electrode.

Comparative Example 2

A negative electrode was produced in the same manner as in Example 1 except that, onto the surface of the metal lithium sheet placed on the anvil of the ultrasonic vibration bonding machine, artificial graphite powder (average particle diameter: 3 μm, specific surface area: 12.8 m$^2$/g) was placed at a rate of 0.7 mg per cm$^2$ of the surface of the metal lithium sheet, in place of the fluorinated graphite powder. A lithium primary battery was fabricated in the same manner as in Example 1 except that the negative electrode thus formed was used.

Example 2

(1) Preparation of Non-Aqueous Electrolyte

Propylene carbonate (PC) and dimethoxyethane (DME) were mixed together in a ratio 1:1 by volume. In the mixed solvent thus obtained (PC-DME solvent), lithium perchlorate (LiClO$_4$) was dissolved, and the concentration of LiClO$_4$ was adjusted to 0.5 mol/L. In the resultant mixture solution, 1,3-propane sultone was dissolved, to prepare a non-aqueous electrolyte (hereinafter simply referred to as "LiClO$_4$/PC-DME"). Here, the 1,3-propane sultone was added in an amount of 2 parts by mass per 100 parts by mass of the mixture solution of the PC-DME solvent and LiClO$_4$.

(2) Formation of Positive Electrode 11

Manganese dioxide (MnO$_2$) was mixed with Ketjen black and fluorocarbon resin (tetrafluoroethylene-hexafluoropropylene copolymer, trade name: "NEOFLON (trademark) FEP", available from Daikin Industries, Ltd.) in a ratio of 100:3:6 by mass. The resultant mixture was mixed with water and isopropyl alcohol and sufficiently kneaded, to prepare a positive electrode material mixture. A positive electrode 11 was formed in the same manner as in Example 1 except that the positive electrode material mixture thus prepared was used.

(3) Formation of Negative Electrode 12

A negative electrode 12 was formed in the same manner as in Example 1.

(4) Fabrication of Lithium Primary Battery 10

For the non-aqueous electrolyte, LiClO$_4$/PC-DME was used in place of the LiBF$_4$/γ-BL. For the positive electrode 11, a positive electrode formed by using MnO$_2$ was used in place of the positive electrode of Example 1 formed by using fluorinated graphite. A lithium primary battery 10 was fabricated in the same manner as in Example 1, except the above.

Comparative Example 3

A lithium primary battery was fabricated in the same manner as in Example 2 except that metal lithium sheet punched into a circle of 18.0 mm in diameter (the same negative electrode 12 in Example 2 except that no coating layer precursor was formed) was used as the negative electrode.

Comparative Example 4

A lithium primary battery was fabricated in the same manner as in Example 2 except that artificial graphite powder (average particle diameter: 3 μm, specific surface area: 12.8 m$^2$/g) was placed on the surface of the metal lithium sheet as in Comparative Example 2, to form a graphite layer thereon.

<Evaluation of Physical Properties of Lithium Primary Battery>

With respect to the lithium primary batteries of Examples 1 to 2 and Comparative Examples 1 to 4, the following tests were performed to evaluate the physical properties thereof.

(1) Evaluation of Initial Static Characteristics

Immediately after fabrication, the lithium primary batteries were subjected to a preliminary discharge at a constant current of 4 mA for 30 minutes, and then aged for 1 day in a 60° C. environment to stabilize the open circuit voltage (OCV). The OCVs of the lithium primary batteries after the preliminary discharge were measured at room temperature. Further, the internal resistances IRs (Ω) of the lithium primary batteries when 1 kHz AC voltage was applied thereto were measured at room temperature (hereinafter, the IR measured under the conditions above is referred to as the "IR at 1 kHz"). In the measurement of initial static characteristics, ten sample batteries were used for each Example and Comparative Example.

(2) Evaluation of Static Characteristics after Storage at High Temperature

Immediately after fabrication, the lithium primary batteries were subjected to a preliminary discharge at a constant current of 4 mA for 30 minutes, and then aged for 1 day in a 60° C. environment. Thereafter, the lithium primary batteries (positive electrode active material: fluorinated graphite) of Example 1 and Comparative Examples 1 to 2 were stored for 3 days, and the lithium primary batteries (positive electrode active material: manganese dioxide) of Example 2 and Comparative Examples 3 to 4 were stored for 1 day, both in a 125° C. environment. The batteries were then allowed to stand for 3 hours at room temperature, and thereafter, the OCVs (V) and the IRs (Ω) at 1 kHz were measured. In the measurement of static characteristics after storage at high temperature, three sample batteries were used for each Example and Comparative Example.

TABLE 1

| | Positive electrode active material | Coating layer | Initial static characteristics | | Static characteristics after storage at high temperature | |
|---|---|---|---|---|---|---|
| | | | OCV [V] | IR [Ω] | OCV [V] | IR [Ω] |
| | | | | | After storage for 3 days | |
| Example 1 | $(CF_{1.0})_n$ | C-LiF | 3.40 | 9.8 | 3.44 | 10.4 |
| Comparative Example 1 | $(CF_{1.0})_n$ | — | 3.41 | 13.6 | 3.44 | 44.5 |
| Comparative Example 2 | $(CF_{1.0})_n$ | Graphite | 3.40 | 10.4 | 3.44 | 20.7 |
| | | | | | After storage for 1 day | |
| Example 2 | $MnO_2$ | C-LiF | 3.18 | 5.3 | 3.29 | 14.7 |
| Comparative Example 3 | $MnO_2$ | — | 3.18 | 8.1 | 3.30 | 21.1 |
| Comparative Example 4 | $MnO_2$ | Graphite | 3.18 | 5.3 | 3.28 | 16.9 |

In Table 1, "$(CF_{1.0})_n$" in the column "Positive electrode active material" represents fluorinated graphite. The column "Coating layer" shows the type of the coating layer formed on the negative electrode surface, in which "C—LiF" represents "a layer of carbon particles having fluorine-containing fine particles on the surfaces thereof", and "–" means that no coating layer is formed on the negative electrode surface.

As is evident from Table 1, in Examples 1 and 2 in which a coating layer containing carbon particles having fluorine-containing fine particles on the surfaces thereof was formed on the negative electrode surface, the initial internal resistance was low and the initial discharge performance was improved as compared to in Comparative Examples 2 and 4 in which a coating layer composed of graphite was formed on the negative electrode surface. Further, in Examples 1 and 2, the increase in internal resistance after storage at high temperature was suppressed, and the discharge performance after storage at high temperature was favorable.

In Comparative Examples 1 and 3 in which no coating layer was formed on the negative electrode surface, because of the exposure of lithium on the negative electrode surface, the non-aqueous electrolyte decomposed on the surface, and the decomposition product was deposited thereon. For this reason, the internal resistance after storage at high temperature was increased. Further, in Comparative Example 1, since the positive electrode active material was fluoride graphite, fluorine derived from the positive electrode reacted with lithium at the negative electrode, to form lithium fluoride on the surface of the lithium. Unlike the lithium fluoride in the coating layer, the lithium fluoride thus formed grew to form a dense film mainly composed of lithium fluoride on the negative electrode surface. For this reason, in Comparative Example 1, particularly after storage at high temperature, the internal resistance was significantly increased.

In Comparative Examples 2 and 4 in which a coating layer composed of graphite was formed on the negative electrode surface, because of the presence of the coating layer composed of graphite, the reaction between the lithium and the non-aqueous electrolyte occurring on the negative electrode surface was inhibited. In addition, since the graphite improves the conductivity, the increase in internal resistance was suppressed as compared to in Comparative Examples 1 and 3. It was impossible, however, to sufficiently inhibit part of the absorbed lithium from reacting with fluorine derived from the positive electrode on the surface of the coating layer composed of graphite, resulted in the formation of a dense film of lithium fluoride on the surface of the coating layer. For this reason, particularly after storage at high temperature, the internal resistance was significantly increased. It should be noted that in the evaluation of initial static characteristics, no abnormality was found in any of the sample batteries of Examples 1 to 2 and Comparative Examples 1 to 4.

<Observation on Negative Electrode Surface>

After the OCV was stabilized in the above (1) of the evaluation of initial static characteristics, the surfaces of the negative electrodes of Example 2, Comparative Examples 1, 3 and 4 were observed under a SEM and analyzed with an EPMA. When the presence of carbon particles having lithium fluoride fine particles on the surfaces thereof was observed in the coating layer on the negative electrode surface, the particle sizes of the carbon particles and the lithium fluoride fine particles were measured.

As a result of the observation on the coating layer of the negative electrode, with regard to the negative electrode of Example 2, the lithium fluoride fine particles were observed in the coating layer. The particle diameter of the carbon particles was within the range of 1 to 45 μm. The particle diameter of the lithium fluoride fine particles was within the range of 20 to 300 nm, and no lithium fluoride fine particle having a particle diameter exceeding 500 nm was observed.

With regard to Comparative Example 1, the presence of lithium fluoride fine particles was observed on the surface of the negative electrode 12, but no carbon particle was observed. With regard to Comparative Example 3, no lithium fluoride fine particle and no carbon particle were observed on the surface of the negative electrode 12. With regard to Comparative Example 4, the presence of carbon particles was observed in the coating layer, but almost no fluorine atom was observed.

Although metal lithium was used as the negative electrode in the above Examples, a lithium alloy may be used as the negative electrode with the same effect as described above.

The lithium primary battery of the invention is suitably used as, for example, a power source for electronic equipment such as portable equipment and information equipment, particularly as a main power source for vehicle-mounted electron equipment which is assumed to be used in a high temperature environment, and a memory backup power source.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A lithium primary battery comprising:
a negative electrode comprising metal lithium or a lithium alloy;
a positive electrode including a positive electrode active material;
a separator interposed between the negative electrode and the positive electrode; and
a non-aqueous electrolyte, wherein:
the negative electrode further comprises a coating layer on a surface thereof facing the positive electrode, and
the coating layer contains carbon particles each having fluorine-containing fine particles on a surface thereof.

2. The lithium primary battery in accordance with claim 1, wherein the carbon particles each have a first surface region covered with the fluorine-containing fine particles and a second surface region where the surface of the carbon particle itself is exposed.

3. The lithium primary battery in accordance with claim 1, wherein the fluorine-containing fine particles have a particle diameter of 500 nm or less.

4. The lithium primary battery in accordance with claim 1, wherein the carbon particles have a volumetric average particle diameter of 0.1 to 30 µm.

5. The lithium primary battery in accordance with claim 1, wherein the fluorine-containing fine particles contain lithium fluoride.

6. The lithium primary battery in accordance with claim 1, wherein the coating layer has a thickness of 0.5 to 30 µm.

7. The lithium primary battery in accordance with claim 1, wherein the positive electrode active material is at least one selected from fluorinated graphite and manganese dioxide.

8. A method for producing a lithium primary battery, the method comprising the steps of:
   preparing a positive electrode including a positive electrode active material;
   forming a coating layer precursor containing fluorinated graphite on at least a part of a surface of a negative electrode comprising metal lithium or a lithium alloy;
   placing a separator between the positive electrode and the negative electrode such that the coating layer precursor and the positive electrode face each other, to form an electrode assembly; and
   bringing the coating layer precursor into contact with a non-aqueous electrolyte, to form a coating layer on the surface of the negative electrode facing the positive electrode, the coating layer containing carbon particles each having fluorine-containing fine particles on a surface thereof.

9. The method in accordance with claim 8, wherein the fluorinate graphite has a volumetric average particle diameter of 0.1 to 30 µm.

10. The method in accordance with claim 8, wherein the positive electrode active material is at least one selected from fluorinated graphite and manganese dioxide.

11. The lithium primary battery in accordance with claim 1, wherein:
   the negative electrode comprises a negative electrode active material layer and the coating layer on a surface of the negative electrode active material layer, and
   the negative electrode active material layer comprises the metal lithium or the lithium alloy.

\* \* \* \* \*